(No Model.) 4 Sheets—Sheet 2.
P. WEILBACH.
CAR BRAKE AND STARTER.
No. 397,765. Patented Feb. 12, 1889.
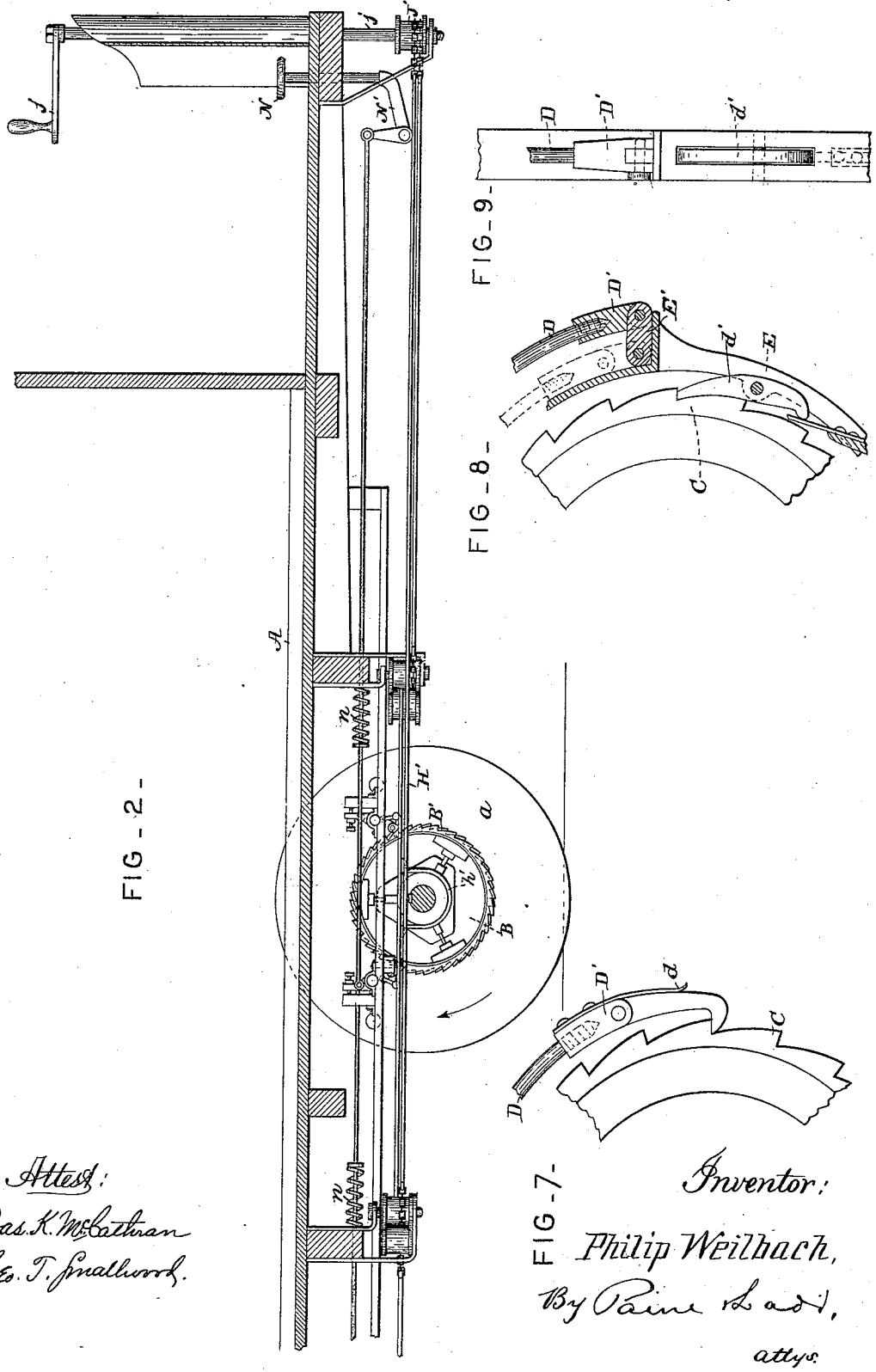

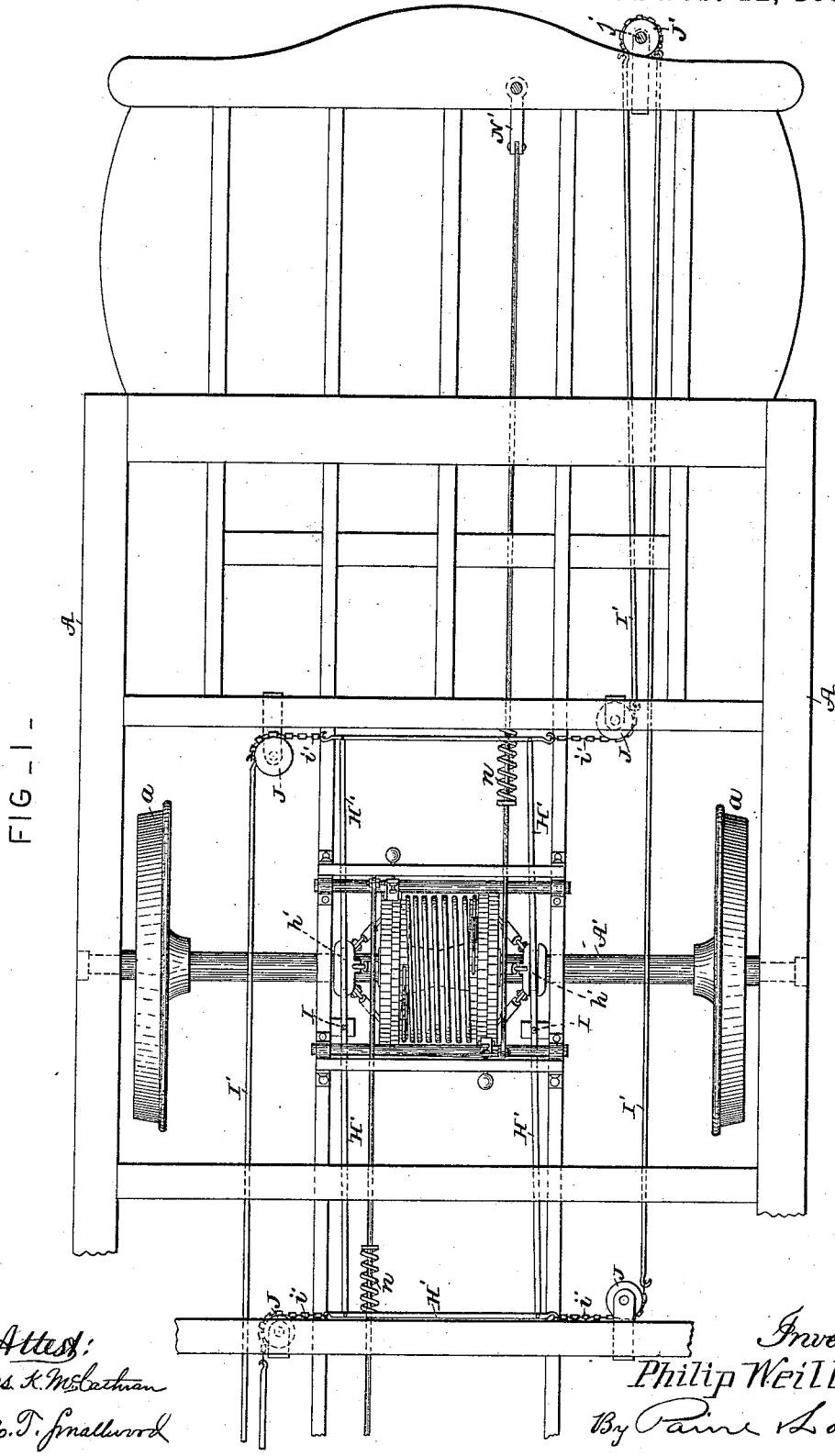

(No Model.) 4 Sheets—Sheet 3.
P. WEILBACH.
CAR BRAKE AND STARTER.
No. 397,765. Patented Feb. 12, 1889.
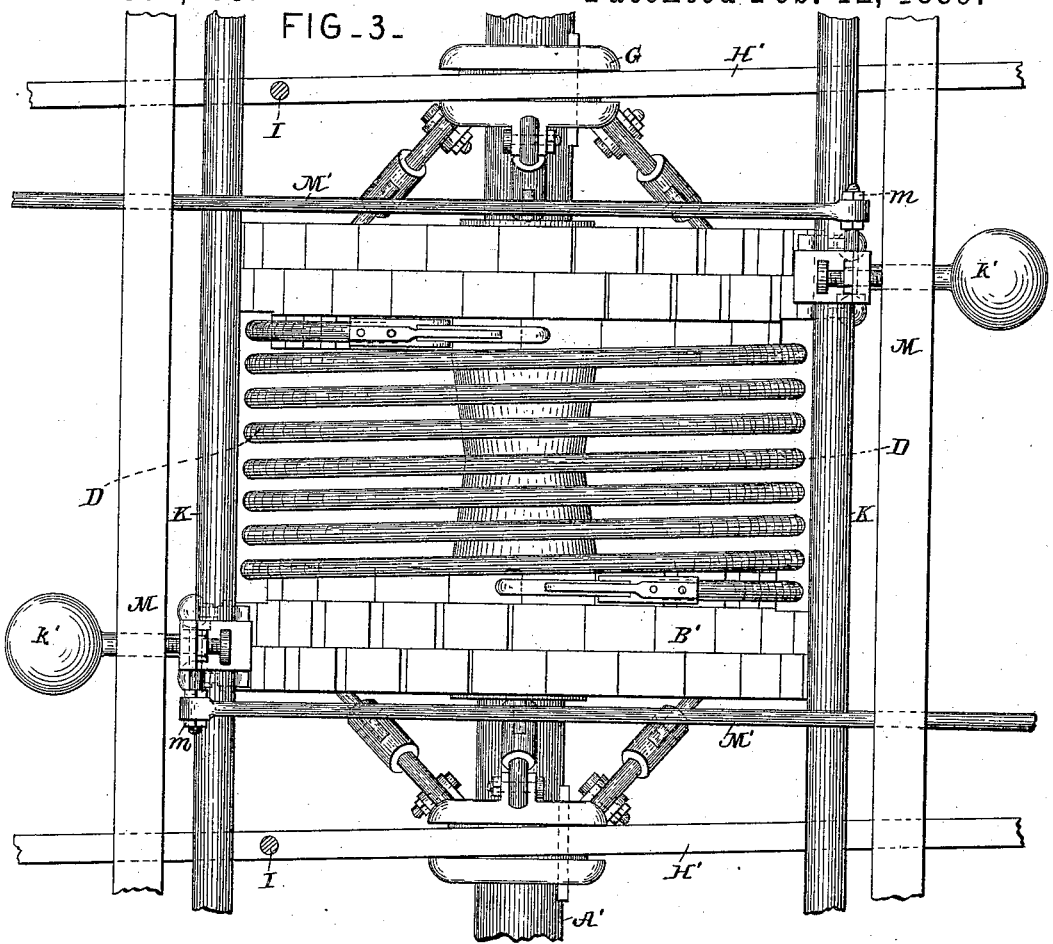
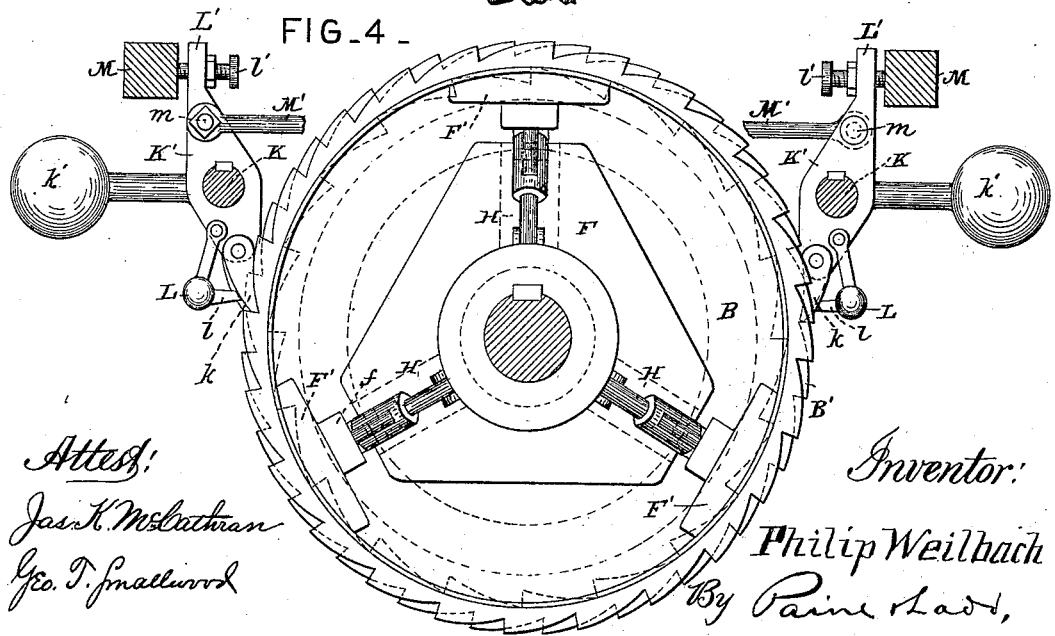

(No Model.) 4 Sheets—Sheet 4.

P. WEILBACH.
CAR BRAKE AND STARTER.

No. 397,765. Patented Feb. 12, 1889.

Attest:
Jas. K. McCathran
Geo. T. Smallwood

Inventor:
Philip Weilbach
By Paine & Ladd
attys:

UNITED STATES PATENT OFFICE.

PHILIP WEILBACH, OF COPENHAGEN, DENMARK.

CAR BRAKE AND STARTER.

SPECIFICATION forming part of Letters Patent No. 397,765, dated February 12, 1889.

Application filed August 18, 1888. Serial No. 283,162. (No model.)

*To all whom it may concern:*

Be it known that I, PHILIP WEILBACH, a subject to the King of Denmark, residing at Copenhagen, in the Kingdom of Denmark, have invented certain new and useful Improvements in Car Brakes and Starters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for starting street-cars, but it is also applicable to gas-engines and other motors and machines wherein the inertia of heavy parts has to be overcome in starting; hence although the following description and claims describe the invention as applied to the axle of the car, to which initial motion is to be given, yet it will be clearly understood that the axle may represent the shaft of a motor or a machine, and that the specification and claims cover all such analogous applications of the invention.

The invention consists in the novel construction and combination of the parts, hereinafter fully described and claimed, whereby a reliable and effective starting of the car is secured.

Figure 5:
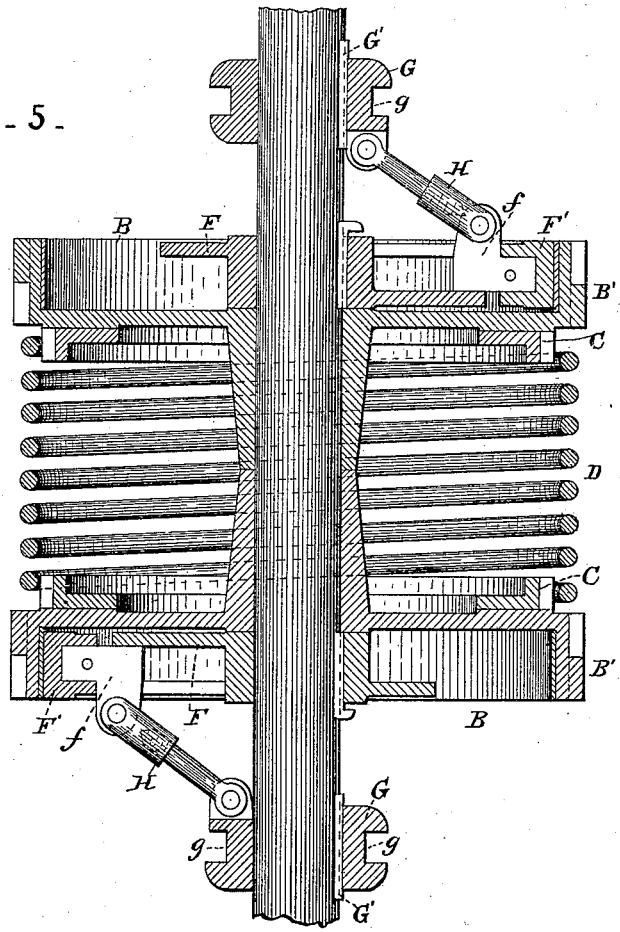
Figure 6:
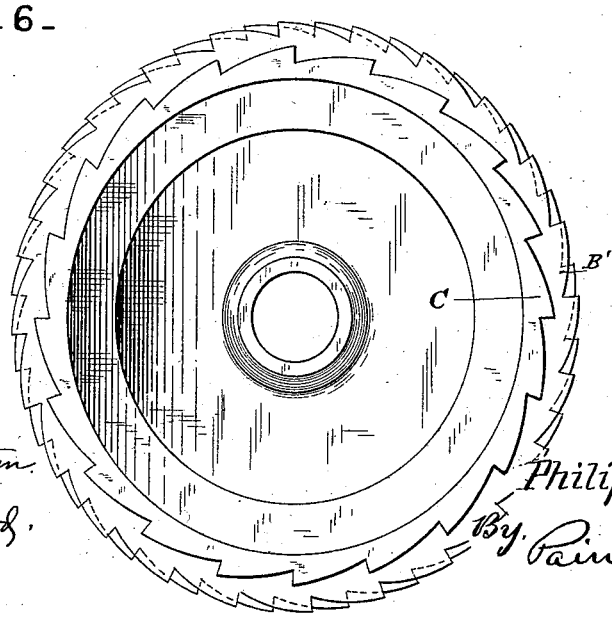

In the drawings, Figure 1 is a plan view of one end of a car, showing the car-starter applied thereto. Fig. 2 is a side elevation of the same. Fig. 3 is a detail plan view of the car-starting mechanism. Fig. 4 is an end view of the car-starting mechanism. Fig. 5 is a sectional plan view through the center of the said car-starting mechanism. Fig. 6 is a side view of the ratchet-wheel to which the end of the spring is attached. Fig. 7 is a detail side view of the pawl on the end of the spring for engaging with the ratchet-wheel. Fig. 8 is a modification of the pawl on the end of the spring, and Fig. 9 is a front view of the same.

A is the framing of the car, and A' is the axle provided with wheels $a$, of ordinary construction.

B B are internal friction-wheels provided with central hubs loosely journaled upon the axle and keeping said friction-wheels at a fixed distance apart. Ratchet-teeth B' B' are formed upon the outer periphery of each of the friction-wheels. These teeth may be in a single row or in double rows, and by preference they are constructed with two rows of teeth, which alternate with each other, as shown in Fig. 4. Each friction-wheel also has secured upon its inner side another ratchet-wheel, C, the teeth of which are arranged in the reverse direction from the teeth of the ratchet B'.

D is the spring for starting the car. Each end of this spring has a block, D', secured to it, and to this block a spring-pawl, $d$, is pivoted, for connecting it to the ratchet-wheel C, as shown in Fig. 7.

A modification of the pawl-connection is shown in Figs. 8 and 9, in which the spring-pawl $d'$ is reversed in position, and the block to which the end of the spring is attached is hinged to a ring, E, a segment only of which is shown.

E' is a link, which pivotally connects the block D' with the ring E, and permits the end of the spring to draw inward as the diameter of the said spring is reduced by its being wound up. By means of this hinged attachment the contraction and expansion of the spring incident to the winding and unwinding is compensated for.

The rings E, above referred to, are cylindrically prolonged toward the middle of the apparatus, so as to limit the straining of the springs. This is accomplished either by the springs being wound directly around these cylinders or by their being fitted on the outside with loose rings, around which the springs are wound. These rings move together with the springs during the winding, so that they can follow the different speeds of each single winding, whereby unnecessary friction is avoided. The exterior diameter of the rings corresponds with the smallest interior diameter of the springs when strained.

F F are clutch-disks, which are secured to the axle inside the friction-wheels.

F' F' are the segmental friction-blocks which bear against the said friction-wheels, and $ff$ are arms which slide in grooves in the clutch-disks and have the friction-blocks F' secured upon their outer ends.

G G are collars provided with circumferential grooves $g$. The collars are free to slide longitudinally on the axle, but are keyed to it by the splines G', so as to revolve with the axle.

H H are adjustable arms, which pivotally connect the collars G with the friction-blocks F'.

H' is a rectangular frame, which is connected to the collars G by the loops $h'$, which engage with the grooves $g$. The frame H' is pivoted to the car-frame A by the pins I.

I' I' are rods, and $i'$ $i'$ are chains connected to the ends of the said rectangular frame and passing over guide-sheaves J, supported by the car-frame.

J' is a drum for working the rectangular frame. This drum is mounted upon the shaft $j$, provided with a handle, $j'$, for partially rotating it, and thereby moving the collars G' simultaneously in the same direction.

Other mechanism might be used for operating the collars besides that described, which is merely shown as a convenient and operative device for that purpose, and which does not constitute an essential part of the present invention.

Each ratchet-wheel B' is provided with a pivoted stop-pawl connection, as follows:

K K are shafts journaled upon each side of the ratchet-wheels, and upon each of these shafts a disengaging-cam, K', is secured. Pawls $k$ are pivoted to the lower end of each cam. When two rows of teeth are formed on the ratchet-wheels, two pawls are used—one for each row of teeth. A counter-balance, $k'$, is provided, which presses the lower end of the cam toward the ratchet-wheel and causes the pawls to lie close against the ratchet-teeth.

L is a small weight, which is pivoted to the cam, and is provided with an arm, $l$, which bears against each pawl and keeps them pressed against the ratchet-teeth.

L' is a projecting lug at the top of the cam, and $l'$ is an adjusting-screw, which passes through said lug and bears against a fixed stop, M, on the car-frame. This adjustable stop prevents the lower end of the cam from bearing against the ratchet-teeth.

M' is the disengaging-rod, which is pivoted to the upper part of the cam $k'$ by the pin $m$.

Two disengaging-rods are provided—one for each ratchet-wheel—and the rods are extended to the opposite ends of the car.

N is a fast piece, and N' is a pivoted bell-crank lever for operating the rod M' in one direction, and $n$ is a spiral spring for retracting the disengaging-rod.

The above-described means for operating the disengaging-rod does not form an essential part of the present invention, but is illustrated as being a practicable and convenient method.

It will be noticed that all the mechanism upon one side of the spring D is a duplication of the mechanism upon the opposite side of it, and that it is brought into action according to the direction in which the car is traveling.

The operation of the device is as follows: When the car is to be stopped, the driver, by turning the brake-handles to one side, throws the revolving clutch-blocks into gear with the friction-wheel upon one side of the spring, and at the same time throws the clutch upon the other side of the spring out of action, and the spring is wound up by the revolving-axle until the car is brought to a standstill. The disengaging pawls of the ratchet-wheels on the friction-wheel which is unclutched hold the end of the spring upon that side and permit the spring to be wound tightly.

It will be understood that the brake-handle must be thrown to the side required to bring the right clutch into action. When the car is to be started, the brake-handle is first swung over to the opposite side, so as to shift the clutches to set the clutch that was loose and free the clutch that was set. The driver then releases the locking-pawl on the ratchet-wheel at the end where the clutch is now applied by pressing with his foot on the pedal N. This exerts a pull on the disengaging-rod, which turns the lower end of the cam until the center of the pawl-pivot passes a line drawn through the center of the cam-shaft and the point of the pawl, when the tension of the spring, acting upon the ratchet-wheel, forces the lower end of the cam outward and reverses the pawl upon the face of the ratchet-teeth. The continued motion of the spring and the disengaged ratchet-wheel is communicated to the axle by the friction-wheel and friction-blocks, which, having been shifted, as before described, cause the axle to revolve in the same direction as before.

The pawl-connection on the ends of the spring is for the purpose of allowing the end of the spring to disengage automatically from the winding-ratchet and friction-wheel should a clutch be applied and the car run in the direction which would unwind the spring, the clutch not being thrown out of gear by the time the spring is fully unwound, as any further forcible unwinding of the spring would break it or otherwise damage it, so that it would be useless for its legitimate work. For heavy work, a plurality of springs may be employed, all of them being coupled to the clutch-heads in the same manner as above described. When two or more springs are employed, they are nested into each other, the clutch-heads being provided with two or more rings of ratchet-teeth, C', of successively-decreasing diameter.

What I claim as my invention is—

1. In a car-starter, the combination, with the winding ratchet-wheels journaled upon the axle, of the spring between said ratchet-wheels and the pawls pivotally connected to the ends of the spring and engaging with the teeth of the ratchet-wheels, substantially as and for the purpose set forth.

2. In a car-starter, the combination, with the winding ratchet-wheel journaled upon the axle, of the spring circumjacent to the ratchet-wheel, a ring at the end of the spring, a link pivoting the end of the spring to said ring and permitting said spring to contract in diameter when being wound up, and a pawl pivoted to the said ring and engaging with the teeth of the ratchet-wheel, substantially as and for the purpose set forth.

3. In a car-starter, the combination of the internal friction-wheels journaled upon the axle, the spring between said friction-wheels with its ends connected thereto, the ratchet-teeth upon the outer peripheries of the friction-wheels, the pivoted stop-pawls engaging with said ratchet-wheels, the clutch-disks secured to the axle inside the friction-wheels, and the friction-blocks sliding in said clutch-disks for transmitting the rotary motion to and from the axle and spring, substantially as and for the purpose set forth.

4. In a car-starter, the combination of a revoluble internal friction-wheel journaled upon the axle, a spring having one end connected to said friction-wheel and the other end held stationary, a clutch-disk secured on the axle inside the friction-wheel, friction-blocks sliding in said clutch-disk for communicating its motion to the friction-wheel, a collar splined to the axle, and the adjustable arms pivotally connecting the collar with the friction-blocks, substantially as and for the purpose set forth.

5. In a car-starter, the combination, with two friction-wheels having ratchet-teeth upon their outside peripheries and winding ratchet-wheels secured against their adjacent faces, of a spring between said wheels, pawls pivotally connected to the ends of the spring and engaging with the winding ratchet-wheels, friction-clutches revolving with the axle and adapted to engage alternately with the friction-wheels, and pivoted stop-pawls supported by the car-frame and adapted to engage with the ratchet-teeth upon the friction-wheels, substantially as and for the purpose set forth.

6. In a car-starter, the combination, with a wheel journaled upon the axle and provided with ratchet-teeth upon its periphery, of a cam pivoted to the car-frame and provided with a counter-balance pressing its lower end toward the ratchet-teeth, and a stop limiting the motion of the cam toward said teeth, a pawl pivoted to the lower end of said cam and engaging with the ratchet-teeth, and a disengaging-rod for operating said cam and pawl, substantially as and for the purpose set forth.

7. In a car-starter, the combination, with a wheel journaled upon the axle and provided with ratchet-teeth upon its periphery, of a cam mounted on a shaft journaled in the car-frame and provided with a counter-balance pressing its lower end toward the ratchet-teeth, and an adjustable stop limiting the motion of the cam toward the teeth, a pawl pivoted to the lower end of the cam and engaging with the ratchet-teeth, a weight pivoted to the cam and pressing said pawl against the ratchet-teeth, and a disengaging-rod for operating said cam and pawl, substantially as and for the purpose set forth.

8. In a car-starter, the combination, with a wheel journaled upon the axle and provided with two alternating rows of ratchet-teeth upon its periphery, of a stationary pivoted cam provided with a counter-balance pressing its lower end toward the ratchet-teeth, and a stop limiting its motion toward the teeth, a rod for operating the cam, and two pawls pivoted to the lower end of the cam and engaging with the ratchet-teeth, substantially as and for the purpose set forth.

In testimony whereof I affix my signature in presence of two witnesses.

PHILIP WEILBACH.

Witnesses:
VIGGO CONSTANTINE EBERTH,
LAURITZ NIELSEN.